United States Patent
Kato (10) Patent No.: US 9,806,573 B2
(45) Date of Patent: Oct. 31, 2017

(54) STATOR FOR ROTARY ELECTRIC MOTOR

(71) Applicant: Hiroki Kato, Toyota (JP)

(72) Inventor: Hiroki Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 14/412,059

(22) PCT Filed: Jul. 23, 2013

(86) PCT No.: PCT/IB2013/001603
§ 371 (c)(1),
(2) Date: Dec. 30, 2014

(87) PCT Pub. No.: WO2014/020398
PCT Pub. Date: Feb. 6, 2014

(65) Prior Publication Data
US 2015/0188371 A1 Jul. 2, 2015

(30) Foreign Application Priority Data
Aug. 3, 2012 (JP) ................................. 2012-172495

(51) Int. Cl.
 *H02K 3/12* (2006.01)
 *H02K 3/18* (2006.01)
 *H02K 15/04* (2006.01)
(52) U.S. Cl.
 CPC .............. *H02K 3/12* (2013.01); *H02K 3/18* (2013.01); *H02K 15/045* (2013.01); *H02K 2213/03* (2013.01)
(58) Field of Classification Search
 CPC  H02K 3/18; H02K 3/12; H02K 1/165; H02K 13/04; H02K 13/08; H02K 15/04; H02K 15/06
 See application file for complete search history.

(56) References Cited

U.S. PATENT DOCUMENTS 4,967,464 A * 11/1990 Stephens ................... H02K 3/18
29/596
2001/0011851 A1* 8/2001 Asao ......................... H02K 3/12
310/179
(Continued)

FOREIGN PATENT DOCUMENTS

EP       2 017 854 A1   1/2009
JP       31-011618 Y    7/1956
(Continued)

OTHER PUBLICATIONS

JP 2011147312 A, machine translation Mar. 6, 2017.*
Jun. 6, 2014 Partial Japanese Office Action issued in Application No. 2012-172495.

*Primary Examiner* — Hanh Nguyen
*Assistant Examiner* — Leda Pham
(74) *Attorney, Agent, or Firm* — Oliff PLC (57) ABSTRACT

A stator for a rotary electric machine has a tooth whose width in a circumferential direction is substantially constant in a radial direction of the stator, and a concentrated winding coil including winding conducting wires around the tooth. A height of a first conducting wire of the sixth turn at a tooth's top end side measured from a surface of the tooth is lower than a height of a conducting wire adjacent to a tooth's root end side of the conducting wire measured from the tooth surface. Conducting wires of the first to fifth turns, that is, second conducting wires, have the same height from the surface of the tooth.

7 Claims, 4 Drawing Sheets

(56) References Cited

U.S. PATENT DOCUMENTS

2011/0210558 A1* 9/2011 Stiesdal .................. H02K 3/18
290/55
2012/0274172 A1* 11/2012 Koga ...................... H02K 3/12
310/208

FOREIGN PATENT DOCUMENTS

| JP | 2001-178051 A | 6/2001 | | |
|----|----------------|--------|---|---|
| JP | 2002-223542 A | 8/2002 | | |
| JP | 2004-180396 A | 6/2004 | | |
| JP | WO 2008044703 A1 * | 4/2008 | ............. | H02K 1/165 |
| JP | 2008-167593 A | 7/2008 | | |
| JP | 2011147312 A * | 7/2011 | | |
| JP | 2012-257362 A | 12/2012 | | |
| JP | 2013-005652 A | 1/2013 | | |
| WO | 2008/044703 A1 | 4/2008 | | |

* cited by examiner

FIG. 1A

FIG. 1B
DETAILS OF PORTION A

STATOR FOR ROTARY ELECTRIC MOTOR

BACKGROUND OF THE INVENTION

1. Field of the Invention

The invention relates to a structure of a concentrated winding coil provided on a stator of a rotary electric machine.

2. Description of Related Art

In order to reduce the loss of an electric motor, it is effective to increase the coil space factor (conductor's cross-sectional area/coil's cross-sectional area) of the stator. Therefore, a structure in which thick flat rectangular wires whose cross-sectional shape is rectangular, as conducting wire for forming coils, are wound around the teeth so that each tooth has thereon a single layer of winding is more often employed than a structure in which round wires whose cross-sectional shape is round are wound around the teeth so that each tooth has thereon a plurality of layers of winding. In the meantime, a construction of a stator in which each of the teeth extends radially inward and the width of each tooth in the circumferential direction (the circumferential width of each tooth) is substantially constant in the radial direction is increasingly employed. In this stator construction, the circumferential width of the slots between the teeth in which coils are inserted becomes gradually narrower toward the side of the top ends of the teeth (the inner peripheral side of the stator). In the case where a thick flat rectangular wire is wound around a tooth so as to form a coil of a single layer of winding, it is difficult to change the cross-sectional shape of the coil in the lengthwise direction of the tooth, which gives rise to a problem of the clearance between the coils of adjacent teeth being unfavorably small at the inner peripheral side of the stator, unlike the case where a round wire is wound around a tooth so as to form a coil of a plurality of layers of winding.

Therefore, a method in which the cross-sectional shape of a winding wire is changed so that the cross-section of an entire coil on each tooth is a trapezoid whose height becomes lower toward the top end of the tooth (the inner peripheral side of the stator) according to the shape of the slots between the teeth has been proposed (see, e.g., Japanese Patent Application Publication No. 2001-178051 (JP 2001-178051 A)).

However, the coil described in JP 2001-178051 A requires that the cross-sectional shape and the cross-sectional area of conducting wires that form the coil be changed every turn of the winding, giving rise to a problem of complication of the shape of the winding wire and therefore an increase in cost.

SUMMARY OF THE INVENTION

In light of the foregoing problem, the invention provides a stator for a rotary electric machine which has an improved coil space factor while having a simple and convenient construction.

According to an aspect of the invention, there is provided a stator for a rotary electric machine, the stator including: a tooth whose width in a circumferential direction is substantially constant in a radial direction, and a concentrated winding coil. The concentrated winding coil includes conducting wires wound around the tooth, and the conducting wires includes first conducting wire(s) and second conducting wire(s). The first conducting wire(s) is a conducting wire of one or more turns counted from a side relatively close to a top end of the tooth, and the second conducting wire(s) is a conducting wire of one or more turns adjacent to a root end of the tooth. Height of the first conducting wire(s) from a surface of the tooth is lower than height of the second conducting wire from the surface of the tooth. The height of the second conducting wire(s) from the surface of the tooth is substantially uniform. Each of the height of the first conducting wire(s) and the height of the second conducting wire(s) may be the height of each conducting wire(s) at a top end side of the tooth.

Furthermore, in the foregoing stator for a rotary electric machine, each of the second conducting wire(s) may have a substantially uniform cross-sectional shape and each of the first conducting wire(s) may have a cross-sectional shape that is different from the cross-sectional shape of each of the second conducting wire(s).

Furthermore, in the foregoing stator for a rotary electric machine, a cross-sectional area of each of the first conducting wire(s) may be smaller than a cross-sectional area of each of the second conducting wire(s).

Further, a cross-sectional shape of each of the second conducting wire(s) may be generally flat rectangular, and a cross-sectional shape of each of the first conducting wire(s) may be trapezoidal, pentagonal or triangular.

The stator for a rotary electric machine of the invention as described above achieves an effect of being able to improve the coil space factor of the stator while employing a simple and convenient construction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings. A stator for a rotary electric machine in accordance with an embodiment of the invention is disposed so as to circumferentially surround a rotor that rotates about a center axis, and is provided with concentrated winding coils, and is incorporated in, for example, a common rotary electric motor, a motor-generator, an electricity generator, etc.

Figure 1A:
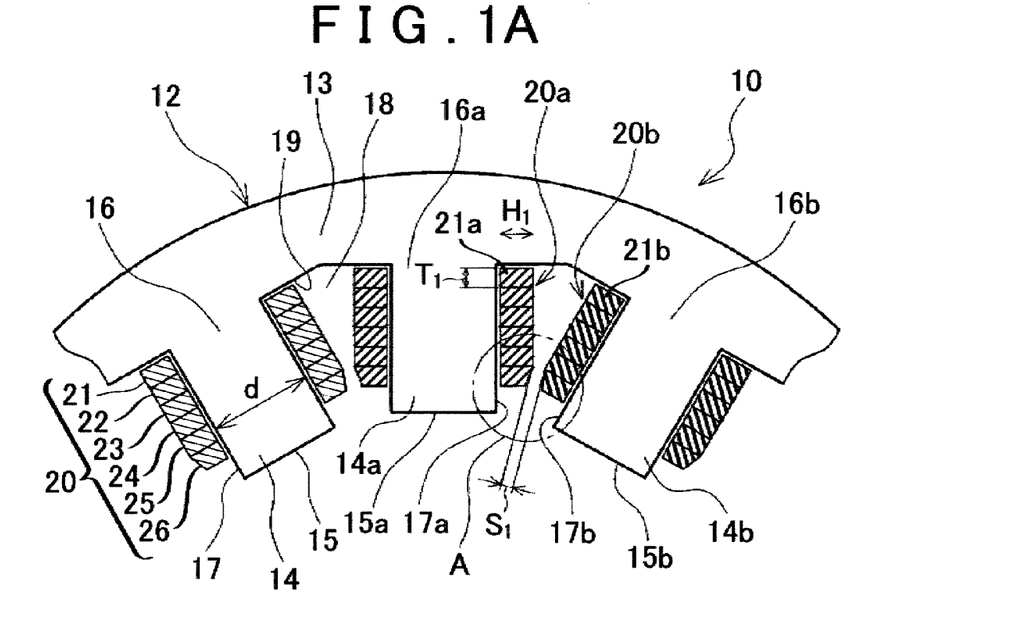
FIG. 1A is a diagram showing a portion of a stator for a rotary electric machine on which concentrated winding coils have been provided in a first embodiment of the invention.

Detailed descriptions of embodiments of the invention will be started with a first embodiment, firstly with reference to FIG. 1A. As shown in FIG. 1A, a stator 10 for a rotary electric machine provided with concentrated winding coils 20 in accordance with the first embodiment has a stator core 12 and a plurality of teeth 14 disposed on the stator core 12.

The stator core 12 has a generally hollow cylindrical yoke 13, and the teeth 14 that extend from an inner peripheral surface 19 of the yoke 13 toward a rotation center axis of the rotary electric machine. The teeth 14 are spaced from each other in the circumferential direction of the yoke 13, and each of the spaces between the teeth 14 forms a slot 18. In the slots 18 there are disposed conducting wires 21 to 26. The conducting wires 21 to 26 extend around each tooth 14, and the conducting wires 21 to 26 wound around each tooth 14 form a concentrated winding coil 20. It is to be noted herein that the conducting wires 21 to 26 on each tooth 14 are portions of a single conducting wire which correspond to six turns that include the first turn disposed on a root end 16 side of the tooth 14 and the sixth turn disposed on the top end 15 side of the tooth 14.

As shown in FIG. 1A, each tooth 14 has a constant width d from the root end 16 on the inner peripheral surface 19 side of the yoke 13 to the top end 15 of the tooth 14. That is, each tooth 14 has a width d in the circumferential direction (circumferential width d) that is constant (or consistent) in the radial direction of the rotary electric machine, and is protruded from the inner peripheral surface 19 of the yoke 13 toward the center axis of the rotary electric machine. Therefore, as shown in FIG. 1A, the interval in the circumferential direction between surfaces 17 of adjacent teeth 14 gradually becomes smaller toward the top end 15 side of the teeth 14, or toward the inner peripheral side of the stator 10.

Figure 1B:
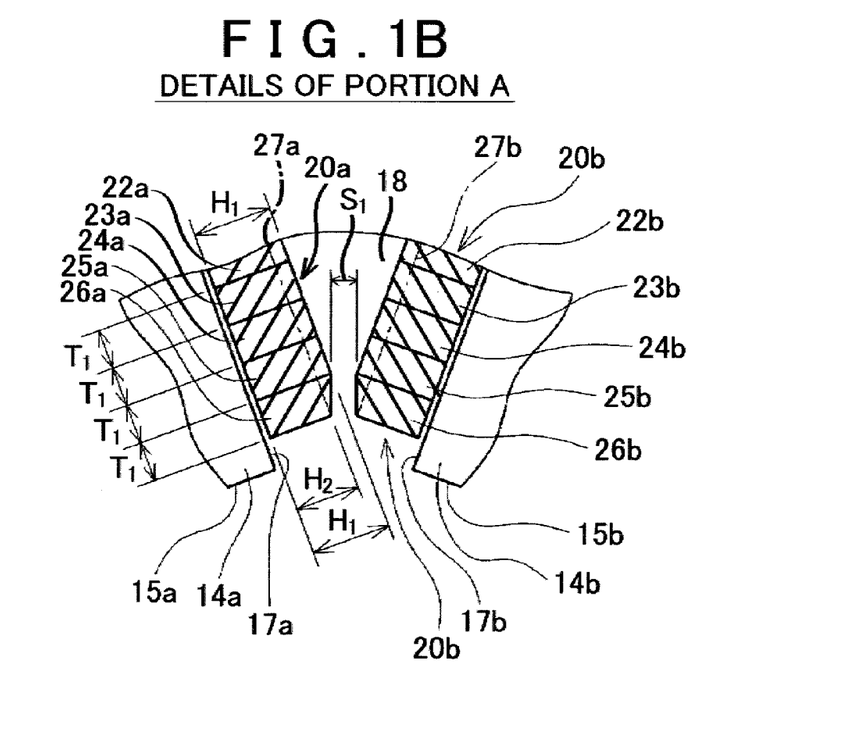
FIG. 1B is a detailed illustration of a portion A shown in FIG. 1A.

As shown in FIG. 1B, in the first embodiment, a concentrated winding coil 20a wound around a tooth 14a shown on the left side in the drawing is made up of two kinds of turns, one of the kinds including the first to fifth turns and the other kind including the sixth turn. The first to fifth turns on the tooth 14a are made by winding conducting wires 21a to 25a that are portions of a flat rectangular wire whose rectangular cross-section has a thickness $T_1$ and a height $H_1$ in such a winding manner that a side of the rectangular cross-sectional shape which corresponds to the thickness $T_1$ faces a slot 18-side surface 17a of the tooth 14a and the sides of the height $H_1$ extend from the surface 17a in a perpendicular direction. The sixth turn on the tooth 14a is made by winding a conducting wire 26a whose cross-sectional shape is a trapezoid that has a thickness $T_1$ and a height $H_1$ at a root end 16a side of the tooth 14a and a height $H_2$ at a top end 15a side of the tooth 14a which is lower than the root end-side height $H_1$ in such a winding manner that a side of the trapezoidal cross-sectional shape which corresponds to the thickness $T_1$ faces the slot 18-side surface 17a of the tooth 14a and the sides of the heights $H_1$ and $H_2$ extend from the surface 17a in the perpendicular direction. The conducting wires 21a to 25a that form the first to fifth turns have the same shape and area of cross-section, and the conducting wire 26a that forms the sixth turn is different in the cross-sectional shape from the conducting wires 21a to 25a, and is smaller in the cross-sectional area than the conducting wires 21a to 25a. Furthermore, the conducting wires 21a to 26a of the first to sixth turns are wound closely to each other with substantially no space left therebetween in the direction of extension of the tooth 14a.

That is, in the concentrated winding coil 20a shown on the left side in FIG. 1B, the height of the conducting wire 26a of the sixth turn at the top end 15a side of the tooth 14a is lower than the common height $H_1$ of the conducting wires 21a to 25a of the first to fifth turns at the root end 16a side of tooth 14a.

Furthermore, a concentrated winding coil 20b wound around a teeth 14b adjacent to the right side of the tooth 14a shown on the left side in the FIG. 1B, similar to the concentrated winding coil 20a wound around the left-side tooth 14a, includes the first to fifth turns sequentially provided on the tooth 14b by winding thereon conducting wires 21b to 25b that are portions of a flat rectangular wire whose rectangular cross-section has a thickness $T_1$ and a height $H_1$ from a surface 17b of the tooth 14b, and the sixth turn provided on the tooth 14b by winding thereon a conducting wire 26b whose cross-sectional shape is a trapezoid that has a thickness $T_1$ and a height $H_1$ at a root end 16b side of the tooth 14b and a height $H_2$ at a top end 15b side of the tooth 14b which is lower than the root end-side height $H_1$.

As shown in FIG. 1B, the conducting wires 21a to 26a and 21b to 26b of the concentrated winding coils 20a and 20b on the left and right teeth 14a and 14b facing each other across the slot 18 are disposed so as to face each other across the slot 18, and the interval (distance) between mutually confronting faces of the conducting wires 21a to 25a and of the conducting wires 21b to 25b becomes gradually smaller toward the top ends 15a and 15b of the teeth 14a and 14b, and the interval is smallest between top end 15a, 15b-side corner portions of the fifth-turn conducting wires 25a and 25b or between root end 16a, 16b-side corner portions of the sixth-turn conducting wires 26a and 26b. This smallest interval is termed least interval $S_1$.

The height of the sixth-turn conducting wires 26a and 26b gradually becomes smaller toward the top ends 15a and 15b of the teeth 14a and 14b from the height $H_1$ to the height $H_2$, so that the interval between the mutually confronting faces of the conducting wires 26a and 26b remains the least interval $S_1$ substantially over the entire dimension of the mutually confronting faces in the radial direction (radial dimension thereof). Therefore, the interval between two adjacent concentrated winding coils 20a and 20b is determined by the foregoing least interval $S_1$. The least interval $S_1$, as shown by the one-dot chain lines 27a and 27b in FIG. 1B, is substantially equal to a least interval between the concentrated winding coils 20a and 20b in a construction in which the conducting wires 21a to 26b of the first to sixth turns of the concentrated winding coils 20a and 20b are flat rectangular wires whose height equals the height $H_2$. Therefore, the concentrated winding coils 20a and 20b in the first embodiment achieve an increased coil space factor while maintaining the same least interval $S_1$, in comparison with the concentrated winding coils 20a and 20b whose first to sixth-turn conducting wires 21a to 26b are flat rectangular wires whose height equals the height $H_2$.

As described above, the first embodiment achieves an effect of being able to improve the coil space factor of the stator 10 and therefore effectively reduce loss while restraining cost increase by employing an easy and convenient method in which the shape of the sixth-turn conducting wire 26 at the top end 15 side of each tooth 14 is a trapezoid whose height becomes gradually smaller toward the top end 15.

Incidentally, although in the foregoing first embodiment, the interval between the mutually confronting faces of the conducting wires 26a and 26b consistently remains the least interval $S_1$ substantially over the entire dimension (length) of the faces in the radial direction of the stator 1, it is also permissible to adopt a construction in which the height $H_2$ of the conducting wires 26a and 26b at the top end 15a, 15b side is further reduced so that the interval between the mutually confronting faces of the conducting wires 26a and 26b becomes increasingly larger than the least interval $S_1$ toward the top ends 15a and 15b. Furthermore, the sides of the trapezoidal cross-sections of the sixth-turn conducting wires 26a and 26b which sides are relatively close to the root ends 16a and 16b of the teeth 14 may have a height that is smaller than the height $H_1$. Still further, although in the foregoing first embodiment, each of the sixth-turn conducting wires 26a and 26b is smaller in cross-sectional area than each of the conducting wires 21a to 25b of the other turns, that is, the first to fifth turns, it is also permissible to adopt a construction in which the thickness of the conducting wires 26a and 26b is made larger than the thickness $T_1$ so that the cross-sectional area of each of the sixth-turn conducting wires 26a and 26b is equal to the cross-sectional area of each of the other, i.e., first to fifth-turn, conducting wires 21a to 25b while the least interval $S_1$ is maintained.

Figure 2:
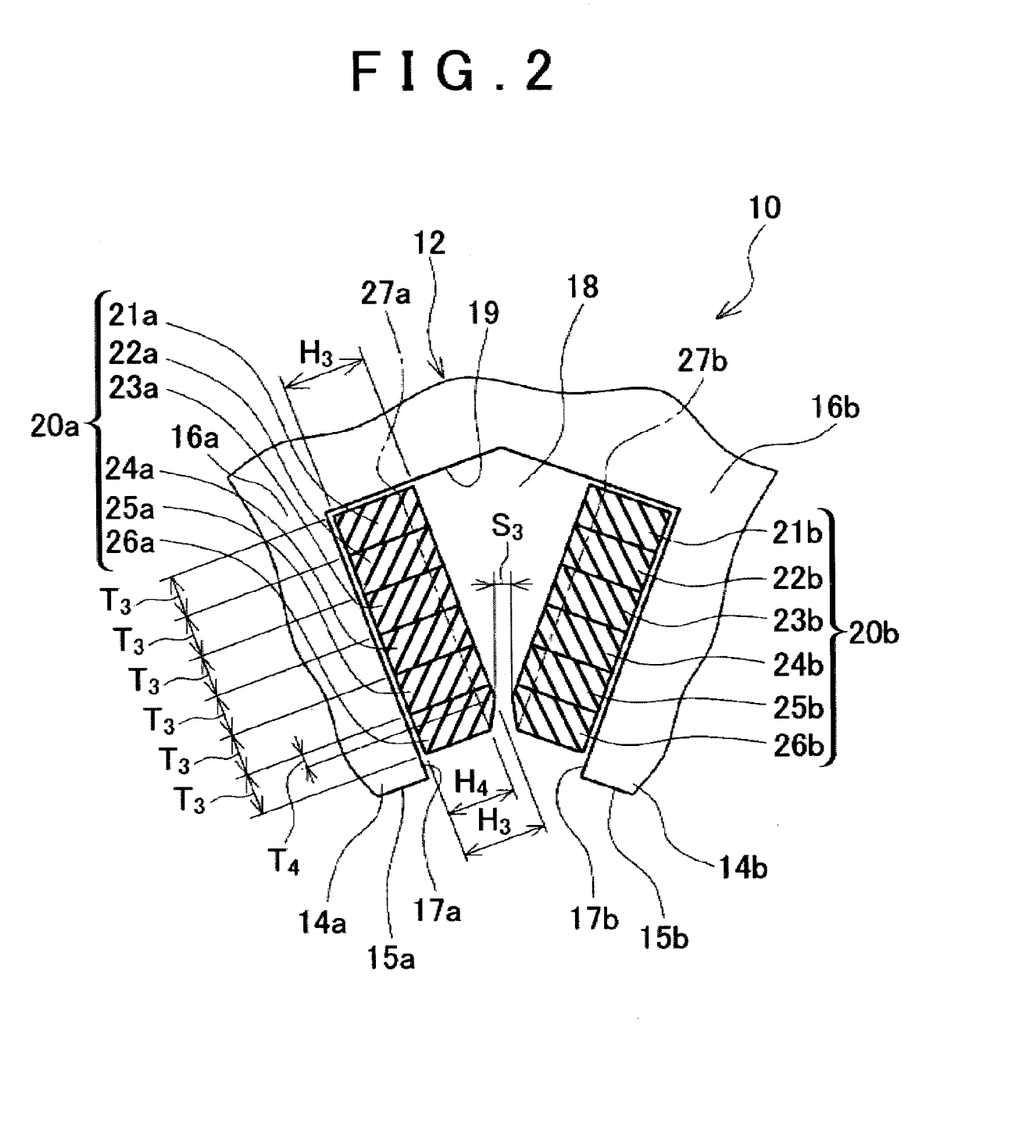
FIG. 2 is a partial view showing that concentrated winding coils have been provided on a stator for a rotary electric machine in accordance with a second embodiment of the invention.

Next, a second embodiment of the invention will be described with reference to FIG. 2. Portions of the second embodiment that are substantially the same as those of the first embodiment described above with reference to FIGS. 1A and 1B are denoted by the same reference characters, and will not be described below. As shown in FIG. 2, in the second embodiment, sixth-turn conducting wires 26a and 26b adjacent to top ends 15a and 15b of teeth 14a and 14b each have a pentagonal cross-sectional shape that is obtained by cutting out each of mutually confronting top end 15a, 15b-side corner portions of the sixth-turn conducting wires 26a and 26b.

As shown in FIG. 2, a concentrated winding coil 20a wound around the tooth 14a shown on the left side in the drawing, as in the first embodiment described above with reference to FIGS. 1A and 1B, includes the first to fifth turns made by sequentially winding conducting wires 21a to 25a that have a rectangular cross-section that has a thickness $T_3$ and a height $H_3$ and the sixth turn made by winding around the tooth 14a a conducting wire 26a that has a pentagonal cross-section that has the thickness $T_3$, a height $H_3$ over a thickness $T_4$ from a side of the pentagonal cross-section which is relatively close to a root end 16a of the tooth 14, and a height $H_4$ that is lower than the height $H_3$ at a side of the pentagonal cross-section which is adjacent to a top end 15a of the tooth 14a. In short, this sixth-turn conducting wire 26a has a pentagonal cross-sectional shape that is obtained by cutting out a top end 15a-side corner portion that faces the sixth-turn conducting wire 26b. The conducting wires 21b to 26b of the first to sixth turns of the concentrated winding coil 20b wound around the tooth 14b adjacent to the right side of the tooth 14a shown on the left side in FIG. 2 have substantially the same construction as the conducting wires 21a to 26a.

As shown in FIG. 2, the interval between the mutually confronting faces of the conducting wires 21a to 26a and the conducting wires 21b to 26b of the concentrated winding coils 20a and 20b that face each other across a slot 18 becomes gradually smaller toward the top ends 15a and 15b of the teeth 14a and 14b, and becomes smallest between corner portions of the sixth-turn conducting wires 26a and 26b that are positioned at the thickness $T_4$ from the root end 16a, 16b side toward the top end 15a, 15b side of the pentagonal cross-section of each of the sixth-turn conducting wires 26a and 26b. This smallest interval is termed least interval $S_3$. As for each of the sixth-turn conducting wires 26a and 26b, the height of each wire becomes gradually smaller from the corner portion at the position of the thickness $T_4$ toward the top end 15a, 15b of the tooth 14a, 14b, and decreases to the height $H_4$ at the top end 15a, 15b-adjacent side of the pentagonal cross-section of the conducting wire 26a, 26b. Over the radial length of the mutually confronting faces of the conducting wires 26a and 26b, the interval between the conducting wires 26a and 26b consistently remains the least interval $S_3$. Therefore, the interval between the two adjacent concentrated winding coils 20a and 20b is determined by the least interval $S_3$. This least interval $S_3$ is equal to the least interval between the first to sixth-turn conducting wires 21a and 26b in a construction in which all the first to sixth-turn conducting wires 21a and 26b are flat rectangular wires whose height equals the height $H_4$, as shown by one-dot chain lines 27a and 27b in FIG. 2.

The foregoing second embodiment achieves an effect of being able to improve the coil space factor of the stator 10 and therefore effectively reduce loss while restraining cost increase by employing an easy and convenient method in which each of the sixth-turn conducting wires 26 is provided with a pentagonal cross-sectional shape obtained by cutting out a top end 15-side corner portion of the cross-section of the sixth-turn winding wire 26 and therefore the height of the sixth-turn conducting wires 26 is lower than the height of the other, i.e., first to fifth-turn, conducting wires 21 to 25.

Incidentally, although in the foregoing second embodiment, the interval between the mutually confronting faces of the conducting wires 26a and 26b consistently remains the least interval $S_3$ over the dimension (width) of the mutually confronting faces in the radial direction of the stator, it is also permissible to adopt a construction in which the height $H_4$ of the conducting wires 26a and 26b becomes increasingly larger than the least interval $S_3$ toward the top ends 15a and 15b. Furthermore, the height of the sixth-turn conducting wires 26a and 26b over the thickness $T_4$ from the side of the pentagonal cross-section which is relatively close to the root end 16a, 16b may be smaller than the height $H_3$.

Figure 3:
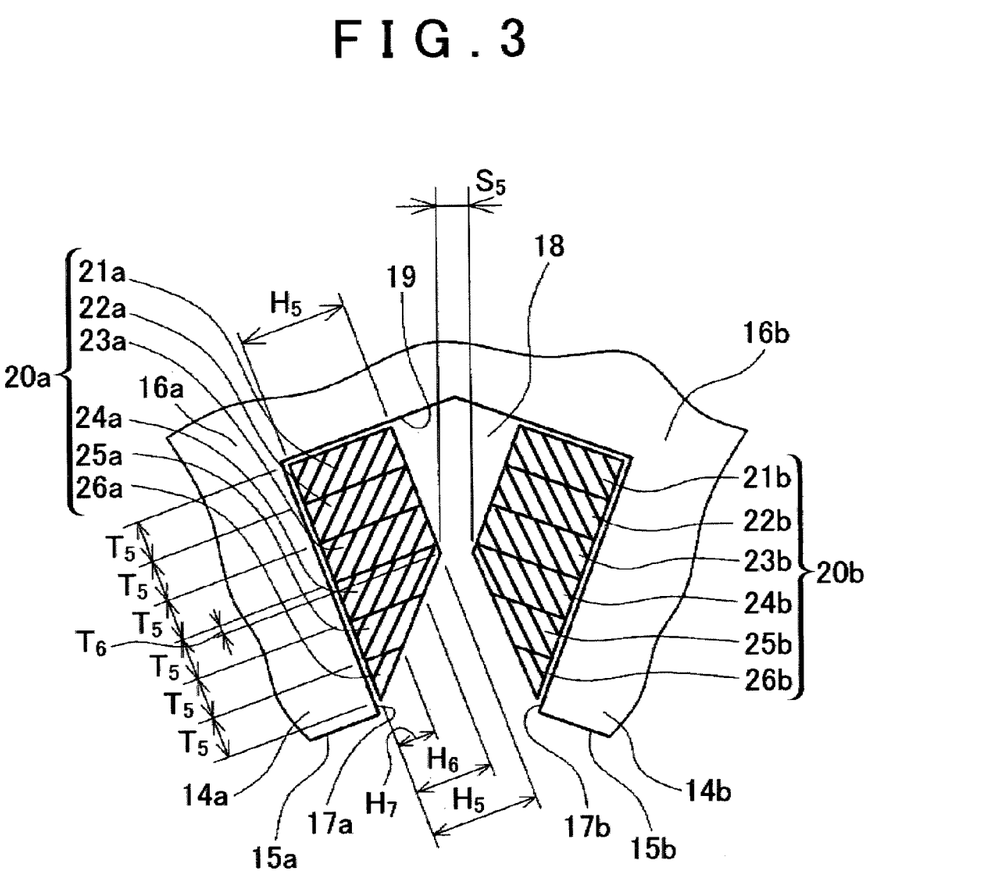
FIG. 3 is a partial view showing that concentrated winding coils have been provided on a stator for a rotary electric machine in accordance with a third embodiment of the invention.

A third embodiment of the invention will next be described with reference to FIG. 3. Portions of the third embodiment that are substantially the same as those of the first and second embodiments described above with reference to FIGS. 1A, 1B and 2 are denoted by the same reference characters, and will not be described below. As shown in FIG. 3, in the third embodiment, a conducting wire 24a, 24b, a conducting wire 25a, 25b and a conducting wire 26a, 26b of the three turns on a top end 15a, 15b-side portion of each of teeth 14a and 14b, that is, the fourth, fifth and sixth turns on each tooth, are pentagonal, trapezoidal and triangular, respectively, in cross section. The cross-sectional shapes of the conducting wires 24a to 26b are different from a cross-sectional shape of first to third-turn conducting wires 21a to 23b, and are smaller in cross-sectional area than the first to third-turn conducting wires 21a to 23b.

As shown in FIG. 3, a concentrated winding coil 20a wound around the tooth 14a shown on the left side in FIG. 3 is made up of four kinds of turns that include the first to third turns, the fourth turn, the fifth turn, and the sixth turn. The first to third turns, as in the first and second embodiments described above with reference to FIGS. 1A, 1B and 2, are made by sequentially winding around the tooth 14a the conducting wires 21a to 23a that are portions of a flat rectangular wire whose rectangular cross-section has a thickness $T_5$ and a height $H_5$. The fourth turn is made by winding around the tooth 14a a pentagonal conducting wire 24a that has a thickness $T_5$, a height $H_5$ over a thickness $T_6$ from a side of the pentagonal cross-section which is relatively close to the root end 16a of the tooth 14a, and a height of a top end 15a-side portion extending from the end of the thickness $T_6$ which is lower than the tooth root end-side height $H_5$ and gradually decreases to a least height $H_6$ of the pentagonal conducting wire 24a. The fifth turn is made by winding around the tooth 14a a conducting wire 25a that has a trapezoidal cross-section that has a thickness $T_5$, a tooth root end $16a$-side height $H_6$ that is equal to the tooth top end $15a$-side height of the conducting wire $24a$, and a tooth top end $15a$-side height $H_7$ that is lower than the tooth root end $16a$-side height $H_6$. The sixth turn is made by winding around the tooth $14a$ a conducting wire $26a$ that has a triangular cross-section that has a thickness $T_5$ and a tooth root end $16a$-side height $H_7$ that is equal to the tooth top end $15a$-side height of the conducting wire $25a$, with the height of the conducting wire $26a$ decreasing to zero at the tooth top end $15a$ side.

That is, in the third embodiment, in the concentrated winding coil $20a$ shown on the left side in FIG. 3, the conducting wires $24a$ to $26b$ of the three turns (fourth to sixth turns) on the top end $15a$-side portion of the tooth $14a$, except for the thickness $T_6$ portion of the conducting wire $24a$ of the fourth turn, is lower than the common height $H_5$ of the conducting wires $21a$ to $23a$ of the other turns (first to third turns). Furthermore, the height of the fifth-turn conducting wire $25a$ is less than the height of the fourth-turn conducting wire $24a$, which is adjacent to the tooth root end $16a$ side of the fifth-turn conducting wire $25a$. Further, the height of the sixth-turn conducting wire $26a$ is less than the height of the fifth-turn conducting wire $25a$, which is adjacent to the tooth root end $16a$ side of the sixth-turn conducting wire $26a$. The heights of the first to third-turn conducting wires $21a$ to $23a$ are substantially equal, and are higher than the heights of the fourth to sixth-turn conducting wires $24a$ to $26a$ on a top end $15a$-side portion of the tooth $14a$. The cross-sectional areas of the conducting wires $24a$ to $26a$ are smaller than the cross-sectional area of the root end $16a$-side conducting wire $23a$, and decrease progressively toward the top end $15a$ of the tooth $14a$, that is, decrease in the order of the conducting wires $24a$, $25a$ and $26a$. The conducting wires $21b$ to $26b$ of the first to sixth turns of the concentrated winding coil $20b$ wound around the tooth $14b$ adjacent to the right side of the tooth $14a$ shown on the left side in FIG. 3 have substantially the same construction as the conducting wires $21a$ to $26a$ of the concentrated winding coil $20a$.

As shown in FIG. 3, the interval between the mutually confronting faces of the conducting wires $21a$ to $26a$ and the conducting wires $21b$ to $26b$ of the concentrated winding coils $20a$ and $20b$ which face each other across the slot $18$ becomes gradually smaller and then gradually larger toward the top ends $15a$ and $15b$ of the teeth $14a$ and $14b$. The interval is smallest, that is, becomes a least interval $S_5$, between corner portions of the fourth-turn conducting wires $24a$ and $24b$ each of which is positioned at the thickness $T_6$ from the tooth root end $16a$, $16b$ side of the fourth-turn conducting wire $24a$, $24b$ toward the top end $15a$, $15b$ side. The height of each of the fourth-turn conducting wires $24a$ and $24b$ becomes gradually less from the corner portion at the position of the thickness $T_6$ toward the top end $15a$, $15b$ of the tooth $14a$, $14b$, and decreases to the height $H_6$ at the top end $15a$, $15b$ side. Then, the height of each of the fifth-turn conducting wires $25a$ and $25b$ gradually decreases from the height $H_6$ at the root end $16a$, $16b$ side to the height $H_7$ at the top end $15a$, $15b$ side. The height of each of the sixth-turn conducting wires $26a$ and $26b$ gradually decreases from the height $H_7$ at the root end $16a$, $16b$ side to a height of zero at the top end $15a$, $15b$-side point. Then, in the third embodiment, slope portions of the conducting wires $24a$ to $26a$ toward the top end $15a$ of the tooth $14a$ form a single flat surface, and slope portions of the conducting wires $24b$ to $26b$ toward the top end $15b$ of the tooth $14b$ also form a single flat surface (i.e., faces of sloped sides of the conducting wires $21a$ to $26a$ form a single surface and faces of sloped sides of the conducting wires $24b$ to $26b$ form a single flat surface). The interval between the mutually confronting flat surfaces becomes increasingly greater than the least interval $S_5$ toward the top ends $15a$ and $15b$ of the teeth $14a$ and $14b$.

Incidentally, although in the foregoing third embodiment, the root end $16a$, $16b$-side height of the conducting wires $24a$ and $24b$ and the top end $15a$, $15b$-side height of the conducting wires $23a$ and $23b$ are equal to the height $H_5$, it suffices that the heights of the conducting wires $24a$ to $26a$ and the conducting wires $24b$ to $26b$ are less than the heights of conducting wires adjacent to the root end $16a$, $16b$ side of the conducting wires $24a$ to $26a$ and of the conducting wires $24b$ to $26b$. In a concrete example, the root end $16a$, $16b$-side heights of the conducting wires $24a$ and $24b$ may be less than the top end $15a$, $15b$-side heights of the conducting wires $23a$ and $23b$. Likewise, the root end $16a$, $16b$-side heights of the conducting wires $25a$ and $25b$ may be less than the top end $15a$, $15b$-side heights of the conducting wires $24a$ and $24b$, or the root end $16a$, $16b$-side heights of the conducting wires $26a$ and $26b$ may be less than the top end $15a$, $15b$-side heights of the conducting wires $25a$ and $25b$.

The third embodiment achieves an effect of being able to improve the coil space factor of the stator $10$ and therefore effectively reduce loss while restraining cost increase by an easy and convenient method in which the top end $15$-side fourth to sixth-turn conducting wires $24$ to $26$ are provided with pentagonal, trapezoidal and triangular cross-sectional shapes such that the fourth to sixth-turn conducting wires $24$ to $26$ become lower in height toward the top end $15$. Incidentally, although in the third embodiment, the cross-sectional shapes of the conducting wires of the three turns on the top end $15a$, $15b$ side are different from the cross-sectional shapes of the conducting wires of the other turns on the root end $16a$, $16b$ side, it is also permissible to adopt a construction in which instead of only the three turns on the top end $15a$, $15b$ side, for example, the four, five or six turns on the top end $15a$, $15b$ side are provided with cross-sectional shapes that are different from those of the other turns on the root end $16a$, $16b$ side.

Figure 4:
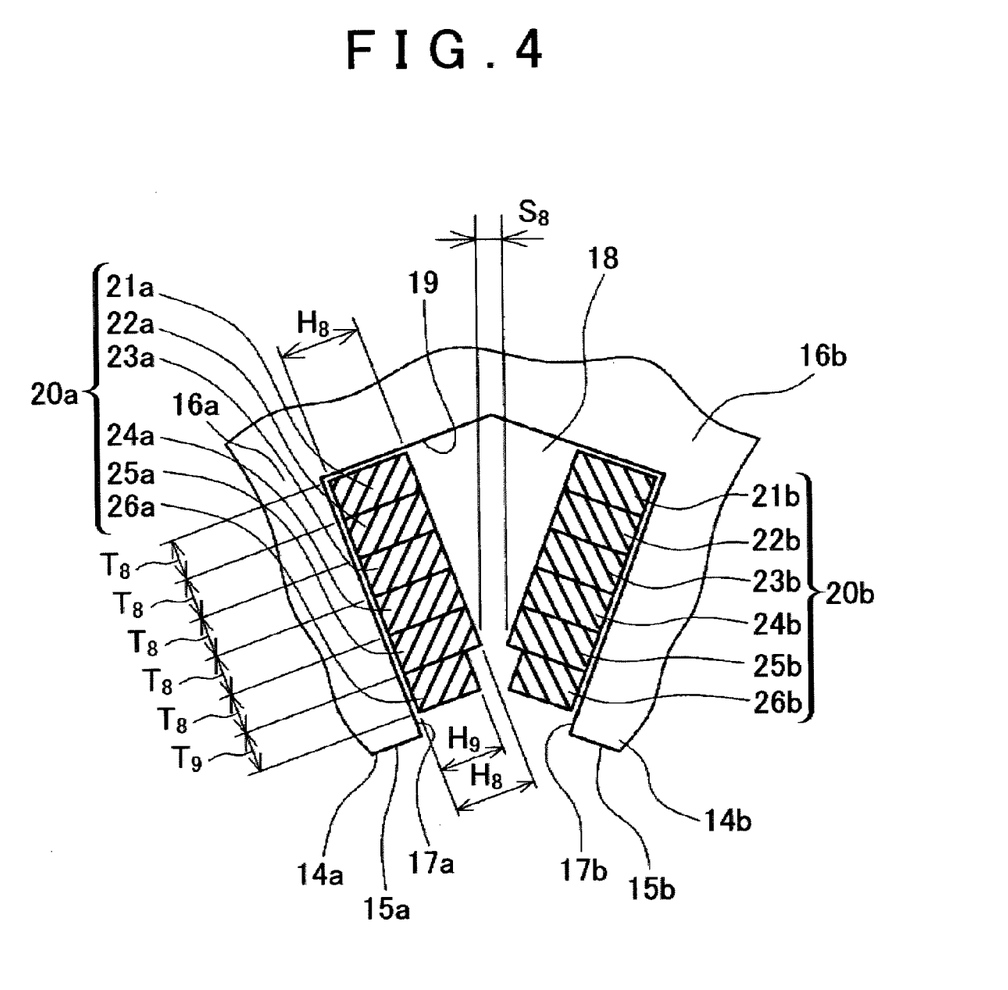
FIG. 4 is a partial diagram showing that concentrated winding coils have been provided on a stator for a rotary electric machine in accordance with a fourth embodiment of the invention.

Next, a fourth embodiment of the invention will be described with reference to FIG. 4. Portions of the fourth embodiment that are substantially the same as those of the embodiments described above with reference to FIGS. 1A to 3 are denoted by the same reference characters, and will not be described below. As shown in FIG. 4, in the fourth embodiment, the sixth-turn conducting wires $26a$ and $26b$ on top end $15a$, $15b$-side portions of the teeth $14a$ and $14b$ are each provided with a rectangular cross-section that is lower in height and smaller in area than the cross-sections of the first to fifth-turn conducting wires $21a$ to $25b$.

As shown in FIG. 4, a concentrated winding coil $20a$ wound around the tooth $14a$ shown on the left side in FIG. 4 is made up of two kinds of turns one of which includes the first to fifth turns and the other of which includes the sixth turn. The first to fifth turns are made by sequentially winding around the tooth $14a$ conducting wires $21a$ to $25a$ that are portions of a flat rectangular wire that has a rectangular cross-section that has a thickness $T_8$ and a height $H_8$, as in the first embodiment described above with reference to FIGS. 1A and 1B. The sixth turn is made by turning around the tooth $14a$ a rectangular conducting wire $26a$ that has a thickness $T_9$ that is thinner than the thickness $T_8$ of the conducting wires $21a$ to $25a$ and a height $H_9$ that is lower than the height $H_8$ of the conducting wires $21a$ to $25a$. That is, the conducting wire 26a is smaller in both thickness and height than the other conducting wires 21a to 25a, and is smaller in cross-sectional area than the other conducting wires 21a to 25a. The first to sixth-turn conducting wires 21b to 26b of a concentrated winding coil 20b wound around the tooth 14b adjacent to the right side of the tooth 14a shown on the left side in the drawing have substantially the same constructions as the conducting wires 21a to 26a wound around the tooth 14a.

As shown in FIG. 4, the interval between the concentrated winding coils 20a and 20b is smallest between mutually confronting top end 15a, 15b-side corner portions of the fifth-turn conducting wires 25a and 25b, and this smallest interval is a least interval $S_8$ between the concentrated winding coils 20a and 20b.

The height $H_9$ of the sixth-turn conducting wires 26a and 26b is lower than the height $H_8$ of the conducting wires 21a to 25b of the other turns, and the interval between mutually confronting faces of the conducting wires 26a and 26b on root end 16a, 16b-side portions of the teeth 14a and 14b is larger than the least interval $S_8$, and the interval between mutually confronting faces of the conducting wires 26a and 26b on top end 15a, 15b-side portions of the teeth 14a and 14b is also larger than the least interval $S_1$. Therefore, the interval between the two adjacent concentrated winding coils 20a and 20b is determined by the least interval $S_8$. This least interval $S_8$ is larger than a least interval in a construction in which all the first to sixth-turn conducting wires 21a to 26b are flat rectangular conducting wires that have the height $H_9$. Therefore, the concentrated winding coils 20a and 20b in the fourth embodiment achieve a greater coil space factor while securing a larger least interval than the concentrated winding coils in which all the first to sixth-turn conducting wires are flat rectangular conducting wires that have the height $H_9$.

That is, the fourth embodiment achieves an effect of being able to improve the coil space factor of the stator 10 and therefore effectively reduce loss while restraining cost increase by an easy and convenient method in which the top end 15-side sixth-turn conducting wires 26 are provided with a cross-sectional shape that is smaller in thickness and height than the cross-sectional shapes of the conducting wires of the other turns.

What is claimed is:

1. A stator for a rotary electric machine, comprising:
    a tooth whose width in a circumferential direction is constant in a radial direction; and
    a concentrated winding coil including conducting wires wound around the tooth, the conducting wires including a first conducting wire and a second conducting wire, the first conducting wire being a conducting wire of one or more turns counted from a side relatively close to a top end of the tooth, the second conducting wire being a conducting wire of one or more turns adjacent to a root end of the tooth, height of the first conducting wire from a surface of the tooth being lower than height of the second conducting wire from the surface of the tooth, and the height of the second conducting wire from the surface of the tooth being uniform,
    wherein a minimum value of an interval in a circumferential direction between the first conducting wires which face each other in a circumferential direction and are wound around teeth adjacent in a circumferential direction is equal to or smaller than a minimum value of an interval in a circumferential direction between the second conducting wires which face each other in a circumferential direction and are wound around the teeth adjacent in a circumferential direction, and
    wherein the height of the first conducting wire from the surface of the tooth becomes gradually smaller toward the top end of the tooth.

2. The stator according to claim 1, wherein
    each of the height of the first conducting wire and the height of the second conducting wire is the height of each conducting wire at a top end side of the tooth.

3. The stator according to claim 1, wherein
    each of the second conducting wire has a substantially uniform cross-sectional shape and each of the first conducting wire has a cross-sectional shape that is different from the cross-sectional shape of each of the second conducting wire.

4. The stator according to claim 1, wherein
    a cross-sectional area of each of the first conducting wire is smaller than a cross-sectional area of each of the second conducting wire.

5. The stator according to claim 1, wherein
    a cross-sectional shape of each of the second conducting wire is flat rectangular, and a cross-sectional shape of each of the first conducting wire is trapezoidal.

6. The stator according to claim 1, wherein
    a cross-sectional shape of each of the second conducting wire is flat rectangular, and a cross-sectional shape of each of the first conducting wire is pentagonal.

7. The stator according to claim 1, wherein
    a cross-sectional shape of each of the second conducting wire is flat rectangular, and a cross-sectional shape of each of the first conducting wire is triangular.

* * * * *